(12) United States Patent
Wright

(10) Patent No.: US 6,714,340 B2
(45) Date of Patent: *Mar. 30, 2004

(54) VEHICLE LICENSE PLATE COVER

(76) Inventor: Michael D. Wright, 4711 E. 870th Rd., Casey, IL (US) 62420

( * ) Notice: Subject to any disclaimer, the term of this patent is extended or adjusted under 35 U.S.C. 154(b) by 0 days.

This patent is subject to a terminal disclaimer.

(21) Appl. No.: 10/330,313

(22) Filed: Dec. 27, 2002

(65) Prior Publication Data

US 2004/0036952 A1 Feb. 26, 2004

Related U.S. Application Data

(63) Continuation of application No. 10/228,376, filed on Aug. 26, 2002, now Pat. No. 6,556,337.

(51) Int. Cl.[7] ............................. G02B 26/00; G02F 1/03; G09F 7/00
(52) U.S. Cl. ........................ 359/296; 359/245; 40/200; 40/205
(58) Field of Search ................................. 359/296, 245, 359/265, 249, 253; 40/200, 205, 209

(56) References Cited

U.S. PATENT DOCUMENTS

| | | | | |
|---|---|---|---|---|
| 4,919,521 | A | * | 4/1990 | Tada et al. ................... 359/296 |
| 5,042,923 | A | | 8/1991 | Wolf ........................... 359/275 |
| 5,105,179 | A | | 4/1992 | Smith .......................... 340/468 |
| 5,105,303 | A | | 4/1992 | Ilhage ......................... 359/273 |
| 5,231,531 | A | | 7/1993 | Defendini ..................... 359/275 |
| 5,494,604 | A | | 2/1996 | Chung ..................... 259/299.01 |
| 5,587,828 | A | | 12/1996 | Bernard ....................... 359/275 |
| 5,875,575 | A | | 3/1999 | Pember ........................ 40/200 |
| 6,230,327 | B1 | | 5/2001 | Briand ............................. 2/8 |
| 6,556,337 | B1 | * | 4/2003 | Wright ........................ 359/245 |

* cited by examiner

Primary Examiner—Georgia Epps
Assistant Examiner—Tim Thompson
(74) Attorney, Agent, or Firm—Technoprop Colton LLC

(57) ABSTRACT

A device and system for selectively obfuscating the specific indicia of at least one of a vehicle's license plates having a tinting plate that is capable of becoming opaque upon the input of energy and that fits over the indicia on the vehicle's license plate, a regulation means that controls the energy input into tinting plate, and an attachment means for attaching the tinting plate to the front of a vehicle's license plate.

36 Claims, 8 Drawing Sheets

VEHICLE LICENSE PLATE COVER

STATEMENT OF RELATED APPLICATIONS

The present application is a continuation of U.S. patent application Ser. No. 10/228,376, filed on Aug. 26, 2002, now U.S. Pat. No. 6,556,337.

BACKGROUND OF THE INVENTION

1. Technical Field.

The present invention relates generally to a device and system for a vehicle license plate cover, and more particularly to a device and system for a vehicle license plate cover in which the specific indicia of a license plate can be selectively obfuscated by the user or can be automatically obfuscated upon turning off the vehicle.

2. Prior Art.

For years, vehicles including cars and motorcycles have been required to display license plates. These license,plates, usually dictated by a governing. authority, serve as unique identifiers of specific vehicles to the appropriate policing authorities. As such, all states require that the license plate be displayed notoriously while the vehicle is on the roads and highways.

While license plates are useful on the roads and highways, license plates can create problems for an owner displaying a vehicle at a tradeshow, and other places where the vehicle is displayed to the public. For example, if the vehicle is a classic or show vehicle being displayed at a tradeshow, and has a high value or desirability, the public or at least the guests attending the tradeshow can see the vehicle's state of origin and obtain the license plate number, and from this information such persons may be able to potentially find the vehicle. As vehicles on display are typically very aesthetically pleasing and unique, some people may use the license plate information to aid them in stealing the vehicle. Specifically, the knowledge of the specific indicia of a license plate corresponding to a particular vehicle may help the potential thief locate the vehicle.

While numerous references in the prior art are directed to license plate covers, none of the references provide a device or system that can selectively obfuscate the specific indicia of a license plate. For example, while U.S. Pat. No. 5,105,179 discloses an electronic license plate and message center for use on automobiles, it does not disclose a means or system for covering the specific indicia of license plates. For another example, while US Pat. No. 5,875,575 discloses a license plate cover that can absorb a laser beam, and therefore possibly prevent speeding tickets, it does not disclose a means for selectively covering the specific indicia of license plates.

Thus, there is a need for a device and system that provides a means for covering the specific indicia of a license plate on a vehicle so that the public cannot view it. As the license plate must be displayed on the roads and highways, there is also a need for a device and system to allow the user to selectively cover and therefore obfuscate the specific indicia of the license plate of a vehicle when the vehicle is off of the road, while allowing the viewing of the specific indicia when the vehicle is on the road. It is to such a device and system that the present invention is directed.

BRIEF SUMMARY OF THE INVENTION

Briefly, the present invention generally provides a device and system for obfuscating the specific indicia of a vehicle license plate. As described herein, the present invention makes it possible to selectively hide from sight the specific indicia of a license plate.

More specifically, the present invention generally is a device and system for selectively obfuscating the specific indicia of a license plate comprising a tinting plate, a regulation means for regulating the tint level of the tinting plate, and an attachment means for attaching the tinting plate over the front of the license plate. The tinting plate can comprise a material that can become tinted upon the introduction of energy; that is, the introduction of energy from a power source reversibly tints the tinting plate. Photochromatic and electrochromatic materials and devices can be suitable for the tinting plate.

The components of the present invention can be linked together in a direct or parallel circuit with a single or a plurality of wires in manner such that the regulation means can control the energy input into the tinting plate, a user can selectively tint and untint the tinting plate by engaging or disengaging the regulation means. For example, in one embodiment of the present invention, the introduction of energy from a power source can tint the tinting plate between at least two tint levels ranging from transparent to opaque. In this embodiment the tinting plate has a transparent tint level and an opaque tint level. When the tinting plate is in the transparent tint level, visible light can pass with relatively little diffusion through tinting plate and the indicia of license plate will be visible to the public. When the tinting plate is in the opaque tint level, little or no light can pass through the tinting plate and the specific indicia of license plate is not visible to the public.

Thus, by engaging and disengaging the regulation means for regulating the tint level of the tinting plate, which can allow energy from the power source, a user can selectively tint and untint the tinting plate. The regulation means preferably is a switch that allows a user to selectively and reversibly change the level of tint in tinting plate. More particularly, when the user is at a location where it is acceptable and desirable to hide from view the specific indicia of a license plate, such as at a tradeshow, the user can select such an appropriate level of tint, for example an opaque tint level, by activating the switch or by placing the switch in an "on" position. Further, when the user is at a location where it is not appropriate to block the indicia of a license plate, such as while on the road or otherwise operating the vehicle in a public or publicly controlled setting, the user can select a level of tint, for example a transparent tint level, by disengaging the switch or by placing the switch in an "off" position. In addition and/or alternatively, the regulation means can be connected to and be controlled by the ignition of engine of vehicle. More specifically, the present invention can be configured so that the tinting plate is not tinted when the engine of the vehicle is on, and tinted when the engine of the vehicle is off.

Another embodiment of the present invention is a system for selectively obfuscating the specific indicia of the license plate comprising a tinting plate, a means for mounting the tinting plate over the license plate, a plurality of wires for connecting the tinting plate to the vehicle's battery and for connecting the components of the system, and a regulation means for regulating the tint level of license plate cover. The plurality of wires can be used to connect the tinting plate to the battery of the vehicle on opposed conductors and in direct or in parallel circuits. The regulation means can be a switch or potentiostat. In such instances, the switch or potentiostat, which can regulate the flow of electricity through the circuit, can enable a user to selectively energize the tinting plate, which selects the level of tint in the tinting plate. The system can be integrated relatively easily into a standard vehicle.

In operation and use, the present invention allows users to selectively hide from sight the specific indicia of a license plate. More specifically in one embodiment, the user engages a switch, which can energize the tinting plate. As tinting plate is energized, it can become tinted and eventually can become opaque so to it hides from site indicia of license plate. When the user is ready for the specific indicia of the license plate to seen to by viewers, the user can disengage the switch, which stops the energy from flowing to the tinting plate. After the energy has been stopped from flowing to the tinting plate, the tinting plate can become transparent. As such, the user can use the present invention to selectively expose indicia of license plate.

As vehicles can have more than one plate (depending on state or federal law), the present invention can comprise two tinting plates. In such embodiments, the tinting plates are placed over both (or either) of the license plate and the present invention can be used to obfuscate one (or both) of the license plates. More specifically, in such situations where vehicle has two license plates, it is contemplated that the present invention can be developed so that the indicia of either or both of license plates can be selectively obfuscated.

These features and other features and advantages of the present invention will become more apparent to those of ordinary skill in the relevant art when the following detailed description of the preferred embodiments is read in conjunction with the appended drawings in which like reference numerals designate like components throughout the several views.

DETAILED DESCRIPTION OF THE PREFERRED EMBODIMENTS

Illustrative embodiments of the license plate cover 10 according to the present invention are shown in FIGS. 1 through 8. Although vehicle 20 as shown in the figures is a motorcycle, it is understood that license plate cover 10 may be used on any vehicle, including motorcycles, cars, trucks, trailers, and the like. Further, although license plate cover 10 is shown on the rear license plate, it is understood that license plate cover 10 can be applied to a front plate, that a vehicle can have more than one license plate 30, and that license plate cover 10 can be applied to one or both of the license plates. While the invention is described herein in conjunction with the preferred embodiments, it will be understood that the invention is not limited to these embodiments.

Figure 1:
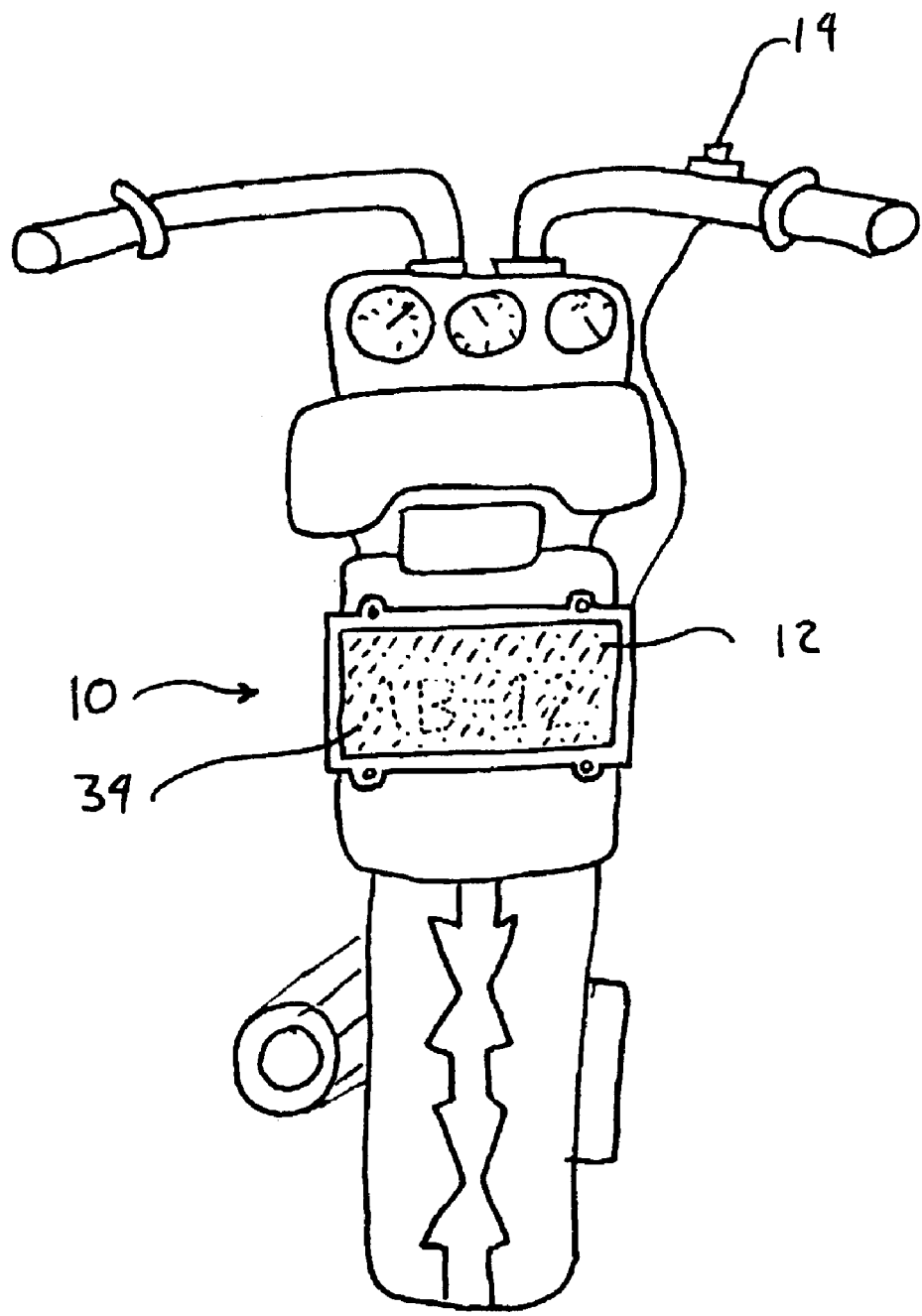
FIG. 1 is a front view of the present invention as mounted on the rear of a vehicle, specifically a motorcycle.

As shown in FIG. 1, a typical vehicle has at least one license plate 30 with specific indicia 34. Specific indicia 34 of license plate 30, often dictated by state or federal government, can comprise information such as the expiration month and year, state and county of residence, and the license plate number and letters. Embodiments of the present invention generally provide a device for selectively obfuscating specific indicia 34 of license plate 30. As shown, license plate cover 10 makes it possible to hide from sight specific indicia 34 (shown as ghost indicia) of license plate 30.

Figure 2:
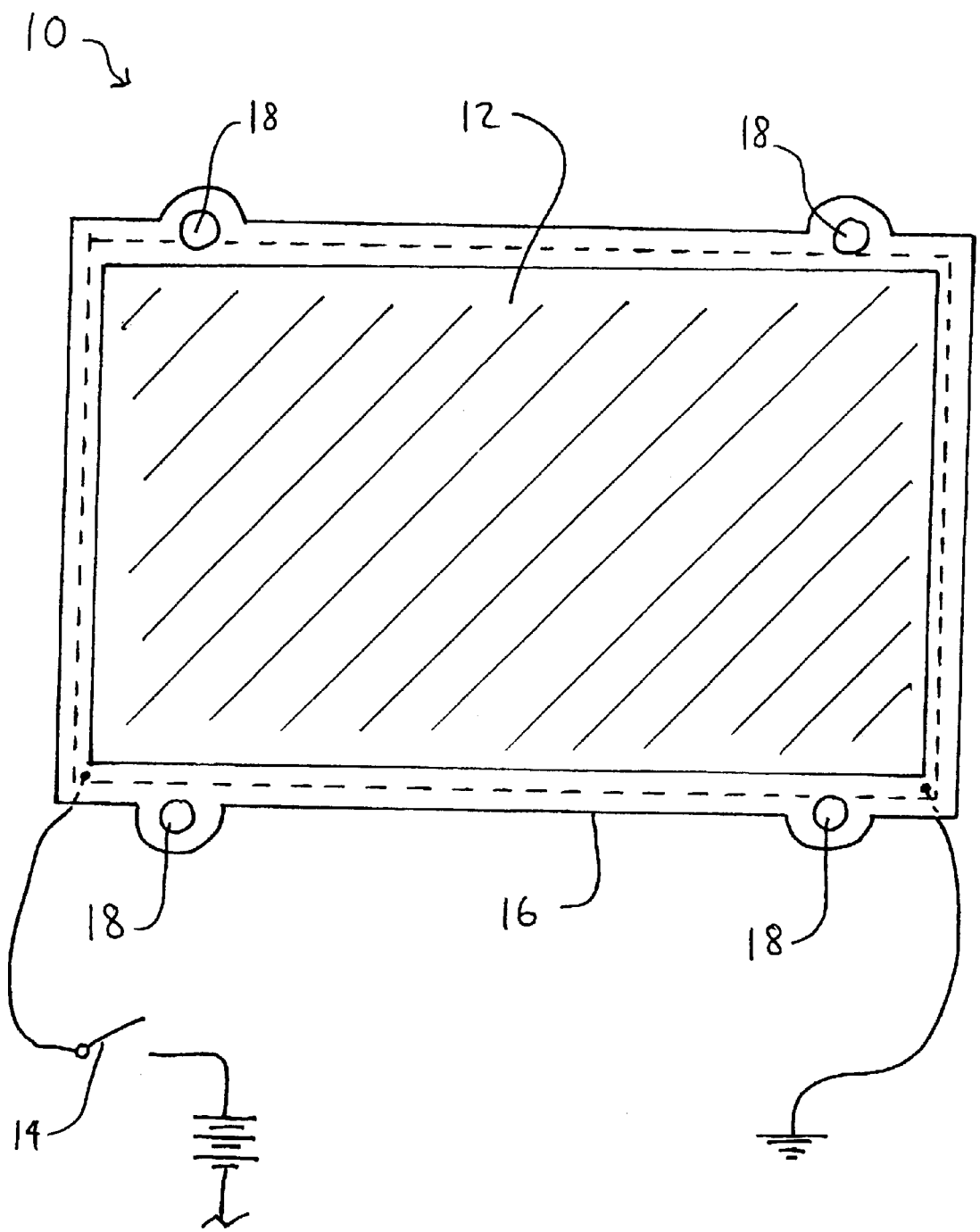
FIG. 2 is a plan view of a first embodiment of the present invention.

Referring now to FIG. 2, a first embodiment of the present invention generally is license plate cover 10 for selectively obfuscating specific indicia 34 of license plate 30. License plate cover 10 comprises tinting plate 12, regulation means 14 (shown as a single pole switch, but which can be a variable switch or potentiostat or a remote control device such as a radio frequency RF or infrared device with an emitter and receiver) for regulating the tint level of tinting plate 12, frame 16, and attachment means 18 for attaching frame 16, tinting plate 12 and license plate 30 to a vehicle. Preferably, tinting plate 12 can be made of from a material that can become tinted upon the introduction of energy; that is, the introduction of energy from power source 50 tints tinting plate 12. Even more preferably, tinting plate 12 can be made from a material that becomes opaque from every viewing angle upon the introduction of energy. As the constituents of license plate cover 10 can be linked together in a direct or parallel circuit with a single or a plurality of wires in manner such that regulation means 14 controls the energy input into tinting plate 10, a user can selectively tint and untint tinting plate 12 by regulation means 14.

Figure 3:
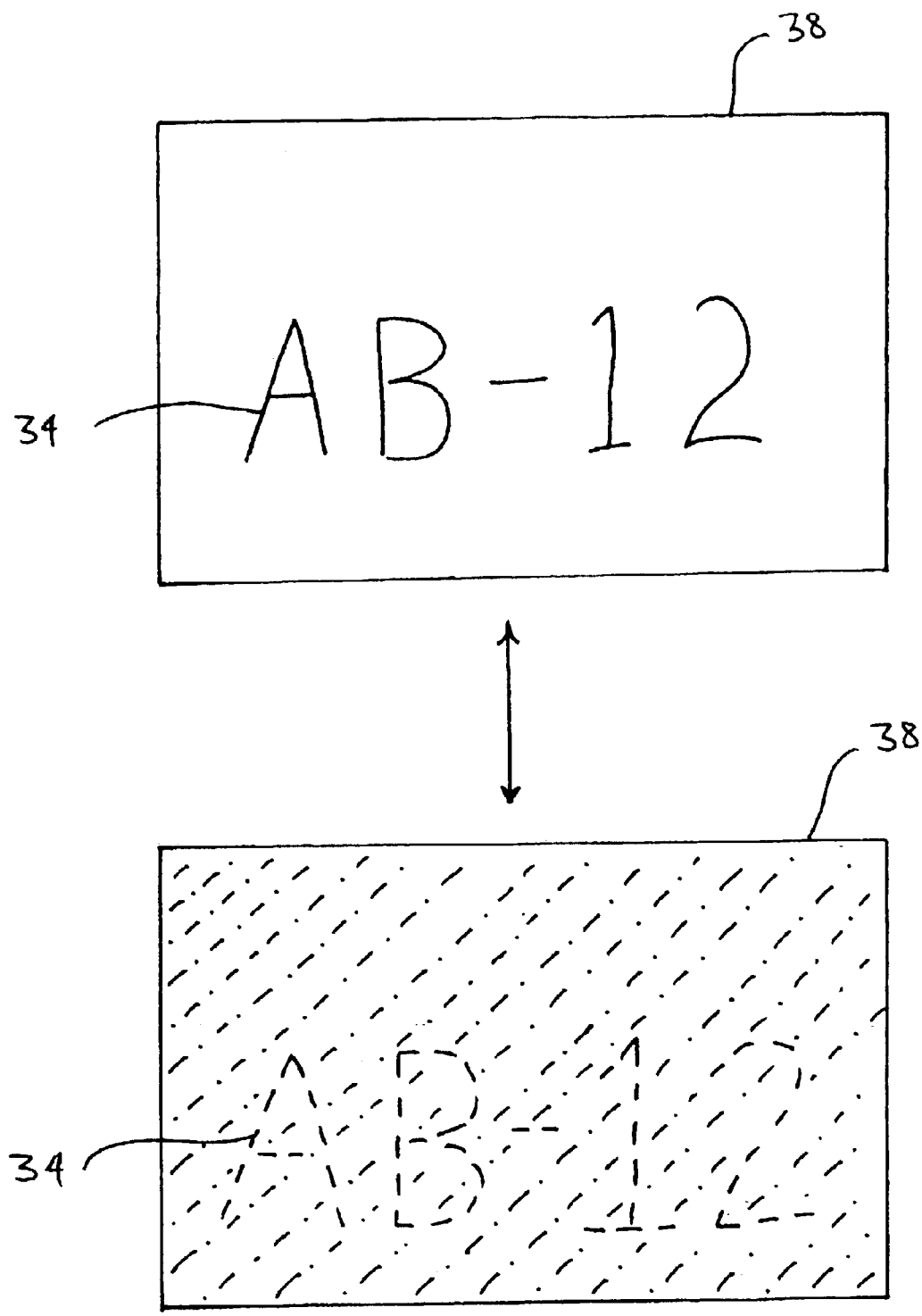
FIG. 3 is a view illustrating the change in tint level of the tinting plate of the present invention.

More specifically, as shown in FIG. 3, the introduction of energy from a power source can tint tinting plate 12 between at least two tint levels ranging from transparent to opaque. Preferably, tinting plate 12 has at least transparent tint level 36 and opaque tint level 38. Even more preferably, the tinting plate 12 is switched between a transparent (or very lightly colored) level and an opaque level. When tinting plate 12 is in transparent tint level 36, the visible light can pass with relatively little diffusion through tinting plate 12 and the indicia 34 of license plate 30 will be visible to the public. When tinting plate 12 is in opaque tint level 38, little or no light passes through tinting plate 12 and specific indicia 34 (shown as ghost indicia) of license plate 12 are not visible to the public.

In one embodiment, regulation means 14 is a switch that allows a user to selectively and reversibly change the level of tint in tinting plate 12. Preferably, by engaging and disengaging the switch, which allows energy from power source 68, a user can selectively tint and untint tinting plate 12. More particularly, when the user is at a location where it is appropriate to hide from view indicia 34 of license plate 30, such as when the vehicle is off the road or in a private setting, the user can select such a level of tint, for example opaque tint level 38, by engaging regulation means 14. Further, when the user is at a location where it is not appropriate to obfuscate indicia 34 of license plate 30, such as when the vehicle is being operated on the road or in other public or publicly controlled settings, the user can select a level of tint, for example transparent tint level 36, by disengaging regulation means 14. As specific indicia 34 of license plate 30 must be visible on the roads and highways, switch 24 provides a means for regulating the tint level of tinting plate 12 and allows a user to ensure that indicia 34 is not obfuscated when it is not desired. Depending on the type of tinting plate 12 used, the introduction of power, such as electricity, either can make tinting plate 12 opaque or transparent, and the removal of power either can make tinting plate 12 transparent or opaque, respectively.

In addition and/or alternatively, regulation means 14 can be connected to and controlled by the ignition of the engine of vehicle 20. For example, when the ignition of the engine is engaged or on, regulation means 14 would maintain tinting plate 12 in transparent level 36, and when the ignition of the engine is disengaged or off, regulation means 14 would maintain tinting plate 12 in opaque level 38. This automatic switch can be used to help ensure that vehicle 20 is not driven on the public roads or highways with the indicia 36 of license plate 30 not displayed, that is, with tinting plate 12 in an opaque 38 configuration.

As one alternative, regulation means 14 can be designed so that tinting plate 12 can only be tinted when a secondary switch (not shown) is activated. This secondary switch can be a wired switch, or a remote switch such as a radio frequency (RF) or infrared device comprising an RF or infrared emitter and receiver that act in concert to activate and deactivate the system. With the use of a secondary switch, tinting plate 12 would remain transparent in the default setting and it would take a conscious effort by the user to activate tinting plate 12 into the opaque setting. Further, the regulation means 14 could lock the tinting plate 12 in the transparent tint level when the vehicle is on (that is, when the engine is on) such that when the vehicle is being used on the road, the tinting plate 12 is always transparent, and could not be made opaque unless and until the vehicle was turned off. In this set-up, if the device were on a vehicle being operated on the road, the specific indicia 34 always would visible, and it would take a combination of turning the vehicle off and conscious effort on the part of the user to opaque the tinting plate 12.

Figure 4:
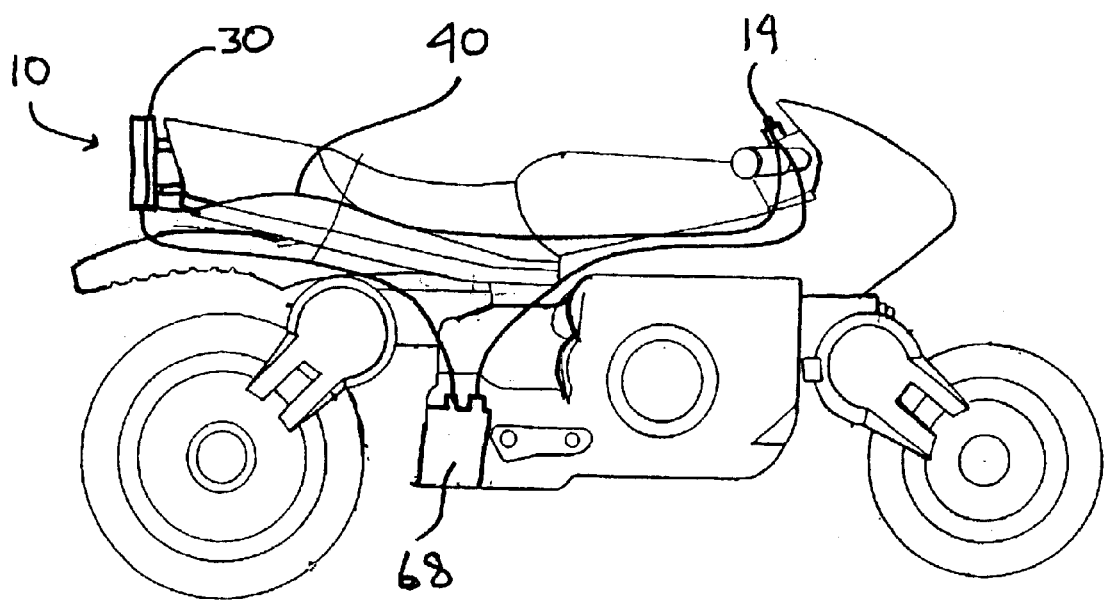
FIG. 4 is a side view of the present invention as mounted on the rear of a vehicle, specifically a motorcycle, and showing exemplary wiring.

Referring now to FIG. 4, another embodiment of the present invention is a system 50 for selectively obfuscating indicia 34 of license plate 30. The system 50 comprises tinting plate 12, frame 16 with attachment means 18 for attaching tinting plate 12 over the front face of license plate 30, regulation means 14 for regulating the tint level of tinting plate 12, a plurality of wires 40 for connecting tinting plate 12 to vehicle battery 50 and to regulation means 14, and for otherwise connecting the components of system 50. Wires 46 can be used to connect tinting plate 20 to vehicle battery 50 on opposed conductors and in a series or in a parallel circuit to regulation means 14. As regulation means 14 can regulate the flow of electricity through the circuit of system 50, the user can use regulating means 14 to selectively energize tinting plate 12, which selects the level of tint of tinting plate 12. The system 50 can be integrated very easily on a standard vehicle such as a motorcycle.

Figure 5:
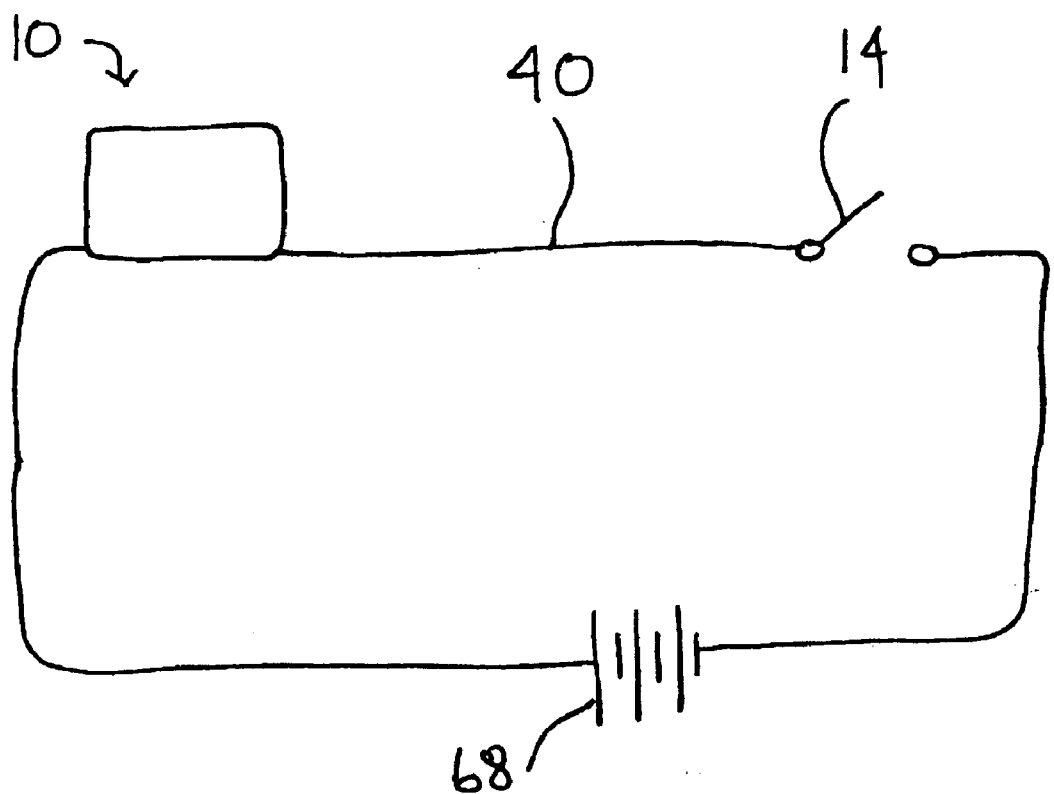
FIG. 5 is an illustrative circuit diagram of the present invention.

FIG. 5 provides a basic diagram of the electrical interaction between components of one embodiment of the invention. As can be seen, the wiring is simple. Other wiring schemes are suitable and can be developed by those of ordinary skill in the wiring arts.

In operation and use, embodiments of the invention can allow users to selectively hide from sight indicia 34 of license plate 30. More specifically in one embodiment, the user engages regulation means 14, which energizes tinting plate 12. As tinting plate 12 is energized, it becomes tinted and eventually becomes opaque so as to hide from sight specific indicia 34 of license plate 30. When the user is ready for specific indicia 34 to seen by viewers, the user disengages regulation means 14, which stops the energy from flowing to tinting plate 12. After the energy is stopped from flowing, tinting plate 12 becomes transparent. As such, the user can selectively hide or expose specific indicia 34 of license plate 20.

Figure 6:
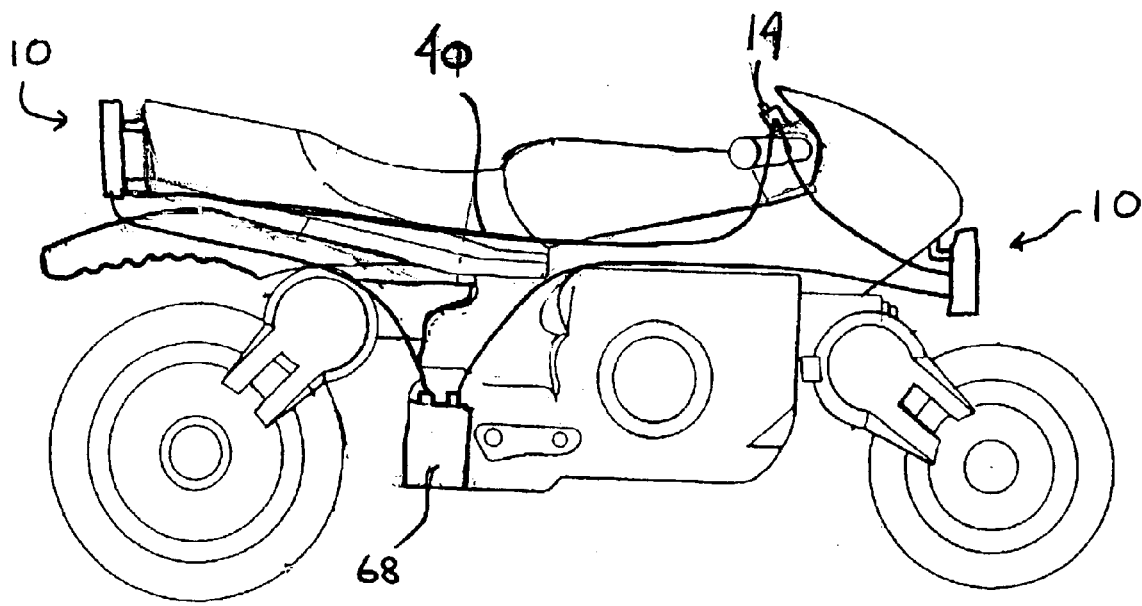
FIG. 6 is a side view of the present invention in a dual license plate embodiment.

As vehicles can have more than one license plate 30 (depending on state or federal law), another embodiment of system 50 comprises two tinting plates 12. Referring to FIG. 6, in this embodiment, tinting plates 12 are placed over both license plates 30 and system 50 can be used to obfuscate either or both of the license plates 30. In situations where vehicle 20 has two license plates 30, it is contemplated that the invention can be developed so that the specific indicia 34 of either or both of license plates 30 can be selectively obfuscated.

There are several materials capable of reversibly tinting and untinting that are suitable for tinting plate 12 and are known in the art. However, most of the known materials are limited in that they either do not provide a completely opaque tint and/or do not provide a completely opaque tint from all viewing angles. For example, such materials can include photochromatic glass, electrochromatic glass, electrochromatic plastic or the like, as the tinting of the material can be controlled by the input or the degree of input of electricity.

Some illustrative examples of materials suitable for tinting plate 12 include the materials disclosed in U.S. Pat. No. 5,494,604 to Chung entitled "Polymer-Dispersed Liquid Crystal Material and Process", U.S. Pat. No. 5,231,531 to Defendini et al. entitled "Electrochromatic Glazings", U.S. Pat. No. 5,042,923 to Wolf entitled "Adjustable Tint Window With Electrochromatic conductive polymer", and U.S. Pat. No. 4,919,521 to Tada et al. entitled "Electromagnetic Device" (which comprises micro-capsules containing suspension anisotropic particles dispersed in a solid matrix layer), each of which is incorporated herein by this reference. Preferably, the materials are highly selectively tintable, scratch resistant, weather resistant, and machined relatively easily. Other materials suitable for use with the present invention also are known in the art.

The materials disclosed above, and other known photochromatic and electrochromatic materials, including commonly known liquid crystal display (LCD) materials, do have certain limitations. Some of these materials are not variably tintable, but switch from transparent to opaque without any intermediate tint. Some of these materials are opaque when viewed perpendicularly, but are less opaque when viewed from other angles, thus allowing the viewer to see through the materials. Some of these materials are photochromatic and are opaque in the light, thus causing problems when used in the daytime (the license plate may be obfuscated at times when it is not desired). Thus, while each of these materials does have some suitability for use as tinting plate 12, their suitability is limited.

Therefore, while such limited materials can be suitable for certain uses of this invention, only recently have materials that provide a satisfactory level of opaqueness at most or all viewing angles been developed. For example, a series of patents to Chakrapani et al. for suspended particle devices disclose a film suitable for use as tinting plate 12 that does have a suitable level of opacity from all relevant viewing angles. U.S. Pat. No. 6,301,040 to Chakrapani et al. entitled "SPD Films Having Improved Properties And Light Valves Comprising Same" and U.S. Pat. No. 6,416,827 to Chakrapani et al. entitled "SPD Films And Light Valves Comprising Same" disclose a cross-linked polymer matrix having droplets of a liquid light valve suspension distributed in the cross-linked polymer matrix that is a suitable and preferred material for tinting plate, and are incorporated herein by this reference. Other recently developed materials that provide a high degree of opacity at all viewing angles also are suitable and preferred for this invention. Another illustrative materials are the chromatic laminated materials distributed by Laminated Technologies, Inc. of Melbourne, Fla., US, which also are incorporated herein by this reference, As the tintable material can require energy to perform its functions, particularly when tinting plate 12 is made from an electrochromatic material, system 50 can need access to a power source. Although the energy can be derived from numerous sources, preferably the power source is the vehicle's battery 50 as this is the most available power source in a vehicle. Alternatively, the power source can be a second battery for the exclusive use by license plate cover 10. It is understood that other power sources such as, but not limited to, solar panels and generator/capacitor combinations, can be used with the present invention. The invention is not limited to a specific power source.

Further, the tintable material of tinting plate 12 can be manufactured in an array of fashions. Preferably, the entire tinting plate 12 is made from a tintable material. Alternatively, a tintable material can be coated on a glass or plastic cover. Alternatively, the tintable material can be sandwiched between two pieces of glass or plastic. Alternatively, two or more plates of tintable material, either alone or in combination with clear or lightly tinted (or colored) plates can be used to make up tinting plate 12. The use of two or more plates of tintable material can help counter the characteristic of LCD materials, for example, which is not opaque when viewed from the side. By using two or more plates of tintable materials oriented or rotated relative to each other, a more opaque (or less transparent) combination can be made. Also the use of two or more plates of tintable material can achieve different characteristics to the final device. The use of lightly tinted (or colored) plates in combination with the tintable plates can add aesthetics to the device. One of ordinary skill in the art can manufacture tinting plate 12 without undue experimentation. The invention is not limited to a specific tintable material.

Figure 7:
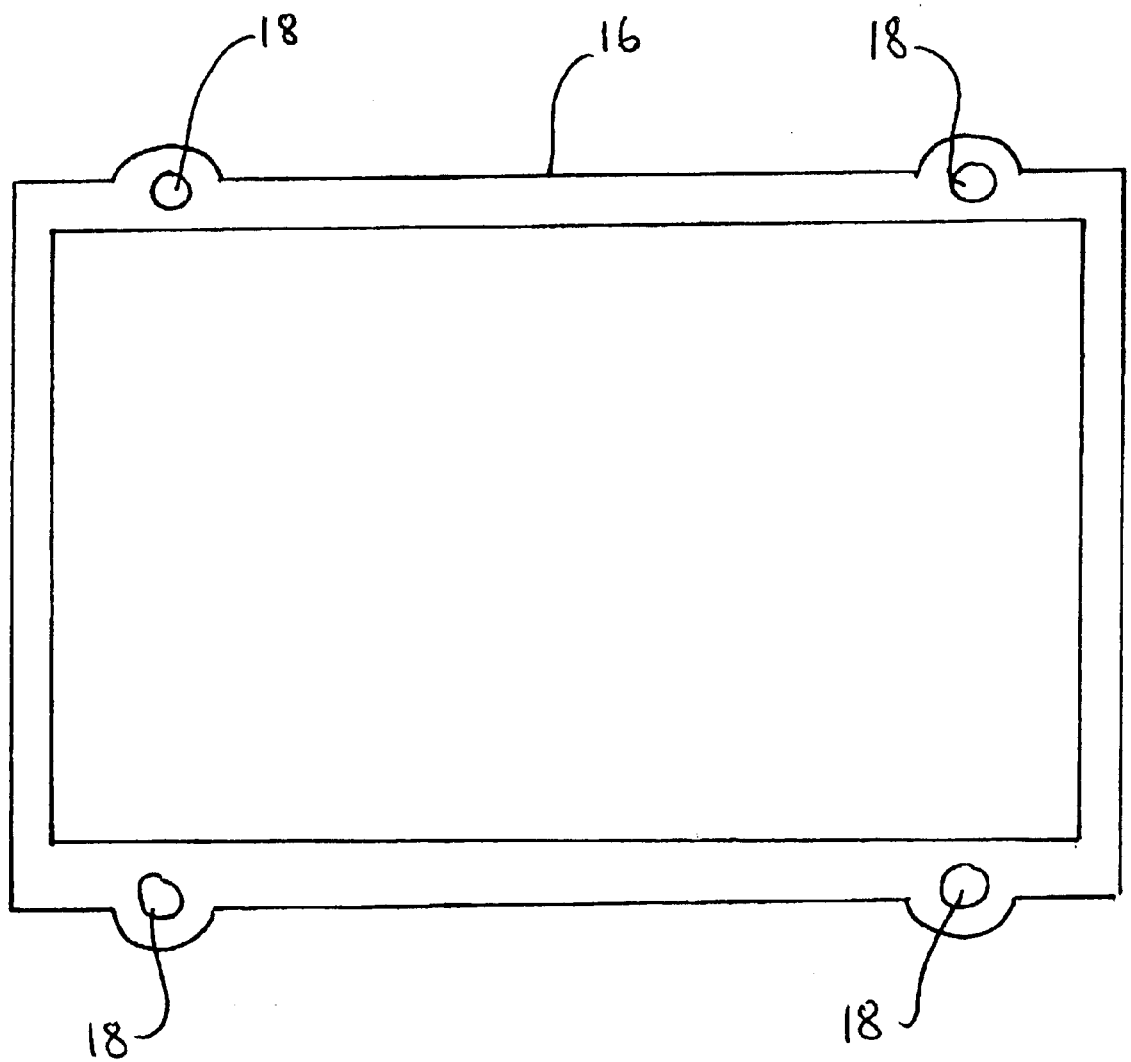
FIG. 7 is a front view of one exemplary attachment means that can be used with the present invention.

Tinting plate 12 can be secured over license plate 30 of vehicle 20 by means known in the art. Referring to FIG. 7, one illustrative securing means for attaching tinting plate 12 and license plate 30 to a vehicle 20 is frame 16 comprising attachment apertures 18 within frame 16 which can correspond to the holes used to install a typical license plate 30 on a vehicle 12. These license plate 30 frames 16 are known in the art. More specifically, using apertures 18, license plate cover 10 can be placed in close operative connection with license plate 30 and then secured by screws therethrough, that is one can use screws to secure the frame 16 over the tinting plate 12 and over the license plate 30 onto the vehicle 20. Other methods for securing tinting plate 12 to license plate 30 and/or to vehicle 20, such with the use of magnets, adhesives, clips or the equivalent, are known in the art.

Figure 8:
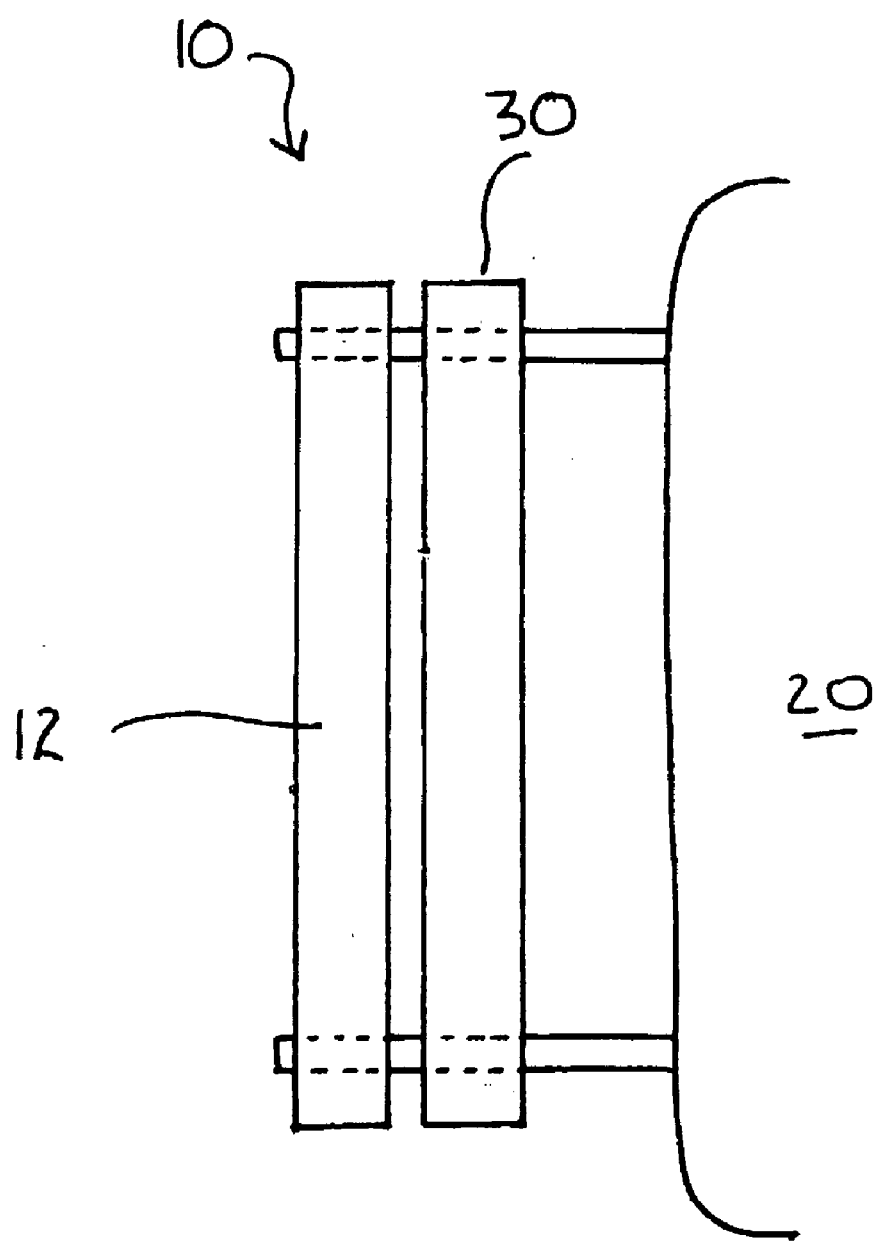
FIG. 8 is a side view of one exemplary embodiment of the present invention.

It is understood that the invention can be made so that it does not distort the appearance of license plate 30, of specific indicia 34 or of vehicle 20. Preferably, tinting plate 12 is formed to be substantially equal to the size of a vehicle license plate 30 and preferably has a thickness of approximately 1/16 to 1/4 of an inch. Preferably, tinting plate 12 is sized and able to fit over specific indicia 34 of license plate 30. Further as shown in FIG. 8, tinting plate 12 can be mounted proximal to license plate 10. In fact, as tinting plate 12 is transparent when it or system 50 is not active, tinting plate 12 may not be noticeable when it or system 50 is not active. However, when the license plate cover 10 or system 50 is active, it will be clear that specific indicia 34 of license plate 30 is not seen; as license plate 30 and specific indicia 34 can detract from the appearance of vehicle 20, the tinting plate 12 can enhance the appearance of vehicle 20.

The above detailed description of the preferred embodiments, examples, and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A license plate cover for selectively obfuscating the specific indicia on a vehicle's license plate comprising:
   a. a tinting plate that fits over the indicia on the vehicle's license plate and is capable of reversibly changing at least from a tinted state to a transparent stab upon the input of energy;
   b. a regulation means that controls the energy input into tinting plate; and
   c. an attachment means for attaching the tinting plate over the indicia of the vehicle's license plate.

2. The license plate cover as claimed in claim 1, wherein the regulation means comprises a switch that is reversibly switchable between at least an on position and an off position and back to control the amount of energy inputted to the tinting plate.

3. The license plate cover as claimed in claim 2, wherein the tinting plate is composed of an electrochromatic material.

4. The license plate cover as claimed in claim 1, wherein the tinting plate further can be selectively tinted to be transparent, opaque and at least one level between transparent and opaque by controlling the amount of energy inputted to the tinting plate.

5. The license plate cover as claimed in claim 4, wherein the energy that is inputted into tinting plate originates from a battery in the vehicle.

6. The license plate cover as claimed in claim 5, wherein the tinting plate is transparent when a motor powering the vehicle is ignited.

7. The license plate cover as claimed in claim 2, wherein the switch can only be activated to change the tinting plate from the transparent state when the motor powering the vehicle is turned off.

8. The license plate cover as claimed in claim 3, wherein the tinted state is opaque from at least one viewing angle.

9. The license plate cover as claimed in claim 3, wherein the tinting plate comprises a tinting component selected from the group consisting of liquid crystal displays, microcapsules containing suspension anisotropic particles dispersed in a solid matrix layer, cross-linked polymer matrices having droplets of a liquid light valve suspension distributed in the cross-linked polymer matrix, and polymer-dispersed liquid crystal displays.

10. A system for obfuscating the specific indicia on a vehicle's license plate comprising:
   a. a tinting plate that fits over the indicia on the vehicle's license plate and is capable of reversible changing from a tinted state to a transparent state upon the input of energy;
   b. a regulation means that controls the energy input into tinting plate;

c. an attachment means for attaching the tinting plate over the indicia of the vehicle's license plate; and d. an energy supply for providing energy to the tinting plate.

11. The system as claimed in claim 10, wherein the regulation means comprises a switch that is reversibly switchable from between at least an on position and an off position and back to control the amount of energy inputted to the tinting plate.

12. The system as claimed in claim 11, wherein the tinting plate is composed of an electrochromatic material.

13. The system as claimed in claim 12, wherein the tinting plate further can be selectively tinted to be transparent, opaque and at least one level between transparent and opaque by controlling the amount of energy inputted to the tinting plate.

14. The system as claimed in claim 13, wherein the tinting plate is transparent when a motor powering the vehicle is ignited.

15. The license plate cover as claimed in claim 14, wherein the switch can only be activated to change the tinting plate from the transparent state when the motor powering the vehicle is turned off.

16. The system as claimed in claim 15, wherein the tinted state is opaque from at least one viewing angle.

17. The system as claimed in claim 16, wherein the tinting plate comprises a tinting component selected from the group consisting of liquid crystal displays, polymer-dispersed liquid crystal displays, micro-capsules containing suspension anisotropic particles dispersed in a solid matrix layer, and a crosslinked polymer matrix having droplets of a liquid light valve suspension distributed in the cross linked polymer matrix.

18. A license plate cover for selectively obfuscating the specific indicia on a vehicle's license plate comprising:

a. a tinting plate that fits over the indicia on the vehicle's license plate and is capable of reversibly changing between at least two tinted states and back upon the input or removal of energy to the tinting plate; and b. a regulation means that controls the tint level of tinting plate.

19. The license plate cover as claimed in claim 18, wherein the regulation means comprises a switch that is reversibly switchable between at least an on position and an off position and back to control the amount of energy inputted to the tinting plate.

20. The license plate cover as claimed in claim 19, wherein the tinting plate is composed of an electrochromatic material.

21. The license plate cover as claimed in claim 18, wherein the at least two tinted states are selected from the group consisting of transparent, opaque and at least one level between transparent and opaque by controling the amount of energy inputted to the tinting plate.

22. The license plate cover as claimed in claim 21, wherein the energy that is inputted into tinting plate originates from a battery in the vehicle.

23. The license plate cover as claimed in claim 21, wherein one of the at least two tinted states is opaque.

24. The license plate cover as claimed in claim 23, wherein the tinting plate is not in an opaque state when a motor powering the vehicle is ignited.

25. The license plate cover as claimed in claim 24, wherein the switch can only be activated to change the tinting plate to an opaque state only when the motor powering the vehicle is turned off.

26. The license plate cover as claimed in claim 20, wherein the tinting plate comprises a tinting component selected from the group consisting of liquid crystal displays, micro-capsules containing suspension anisotropic particles dispersed in a solid matrix layer, cross-linked polymer matrices having droplets of a liquid light valve suspension distributed in the cross-linked polymer matrix, and polymer-dispersed liquid crystal displays.

27. The license plate cover as claimed in claim 20, further comprising an attachment means for attaching the tinting plate over the indicia of the vehicle's license plate.

28. A system for obfuscating the specific indicia on a vehicle's license plate comprising:

a. a tinting plate that fits over the indicia on the vehicle's license plate and is capable of reversibly changing between at least two tinted states upon the input of energy;

b. a regulation means that controls the tint level of the tinting plate; and c. an energy supply for providing energy to the tinting plate.

29. The system as claimed in claim 28, wherein the regulation means comprises a switch that is reversibly switchable from between at least an on position and an off position and back to control the amount of energy inputted to the tinting plate.

30. The system as claimed in claim 29, wherein the tinting plate is composed of an electrochromatic material.

31. The system as claimed in claim 29, wherein the tinting plate can be selectively tinted to be transparent, opaque and at least one level between transparent and opaque by controlling the amount of energy inputted to the tinting plate.

32. The system as claimed in claim 31, wherein the tinting plate is not in an opaque state when a motor powering the vehicle is ignited.

33. The license plate cover as claimed in claim 32, wherein the tinting plate can only be changed to a tinted state when the motor powering the vehicle is turned off.

34. The system as claimed in claim 33, wherein the tinted state is opaque from at least one viewing angle.

35. The system as claimed in claim 28, wherein the tinting plate comprises a tinting component selected from the group consisting of liquid crystal displays, polymer-dispersed liquid crystal displays, micro-capsules containing suspension anisotropic particles dispersed in a solid matrix layer, and a cross-linked polymer matrix having droplets of a liquid light valve suspension distributed in the cross linked polymer matrix.

36. The system as claimed in claim 28, further comprising an attachment means for attaching the tinting plate over the indicia of the vehicle's license plate.

* * * * *

UNITED STATES PATENT AND TRADEMARK OFFICE
CERTIFICATE OF CORRECTION

| | | |
|---|---|---|
| PATENT NO. | : 6,714,340 B2 | Page 1 of 2 |
| APPLICATION NO. | : 10/330313 | |
| DATED | : March 30, 2004 | |
| INVENTOR(S) | : Michael D. Wright | |

It is certified that error appears in the above-identified patent and that said Letters Patent is hereby corrected as shown below:

Claim 1, line 5, corresponding to column 8, line 21, replace "stab" with --state--, and Claim 1, line 8, corresponding to column 8, line 24, insert --the-- prior to the word --tinting--, such that Claim 1 reads:

1. A license plate cover for selectively obfuscating the specific indicia on a vehicle's license plate comprising:
        a. a tinting plate that fits over the indicia on the vehicle's license plate and is capable of reversibly changing at least from a tinted state to a transparent state upon the input of energy;
        b. a regulation means that controls the energy input into the tinting plate; and
        c. an attachment means for attaching the tinting plate over the indicia of the vehicle's license plate.

Claim 5, line 2, corresponding to column 8, line 41, insert the word --the-- prior to the word --tinting--, such that Claim 5 reads:

5. The license plate cover as claimed in claim 4, wherein the energy that is inputted into the tinting plate originates from a battery in the vehicle.

Claim 10, line 4, corresponding to column 8, line 63, replace "reversible" with --reversibly--, and Claim 10, line 8, corresponding to column 8, line 67, insert the word --the-- prior to the word --tinting--, such that Claim 10 reads:

10. A system for obfuscating the specific indicia on a vehicle's license plate comprising:

Signed and Sealed this
Twenty-sixth Day of July, 2011

David J. Kappos
*Director of the United States Patent and Trademark Office*

CERTIFICATE OF CORRECTION (continued)
U.S. Pat. No. 6,714,340 B2 a. a tinting plate that fits over the indicia on the vehicle's license plate and is capable of reversibly changing from a tinted state to a transparent state upon the input of energy;

b. a regulation means that controls the energy input into the tinting plate;

c. an attachment means for attaching the tinting plate over the indicia of the vehicle's license plate; and d. an energy supply for providing energy to the tinting plate.

Claim 22, line 2, corresponding to column 9, line 56, insert the word --the-- prior to the word --tinting--, such that Claim 22 reads:

22. The license plate cover as claimed in claim 21, wherein the energy that is inputted into the tinting plate originates from a battery in the vehicle.